United States Patent [19]

Sawada

[11] Patent Number: 4,546,447
[45] Date of Patent: Oct. 8, 1985

[54] DIVISION APPARATUS
[75] Inventor: Hideo Sawada, Hadano, Japan
[73] Assignee: Hitachi, Ltd., Tokyo, Japan
[21] Appl. No.: 459,149
[22] Filed: Jan. 19, 1983
[30] Foreign Application Priority Data
  Feb. 3, 1982 [JP] Japan .................................. 57-14967
[51] Int. Cl.⁴ ............................................... G06F 7/52
[52] U.S. Cl. .................................................... 364/767
[58] Field of Search ............................... 364/761–767
[56] References Cited
  U.S. PATENT DOCUMENTS 3,591,787 7/1971 Freiman et al. ...................... 364/767
  3,684,879 8/1972 Koehler ............................... 364/767
  3,735,107 5/1973 Bolt et al. ............................. 364/763
  4,413,326 1/1983 Wilson et al. ........................ 364/761

Primary Examiner—James D. Thomas
Assistant Examiner—Dale M. Shaw
Attorney, Agent, or Firm—Antonelli, Terry & Wands

[57] ABSTRACT

A division apparatus. A quotient of one digit and a remainder are determined by repeating execution of a single type processing of adding an integral multiple of a divisor and an intermediate remainder. The apparatus includes first, second and third registers for storing a dividend or the intermediate remainder, the integral multiple of a divisor and a carry resulted from a preceding operation, respectively, a selection circuit for selecting the complement of the integral multiple of the divisor when the carry is zero while selecting the integral multiple of the divisor when the carry is 0, an arithmetic circuit for performing adding operation on the output of the selection circuit and the content of the first register with the carry being served as the initial carry, and a counter for counting a number which corresponds to the integral multiple of the divisor. The result of the arithmetic operation which is executed in dependence on the value assumed by the carry is placed in the first register. The quotient is determined on the basis of the content of the counter.

3 Claims, 6 Drawing Figures

F I G. 1
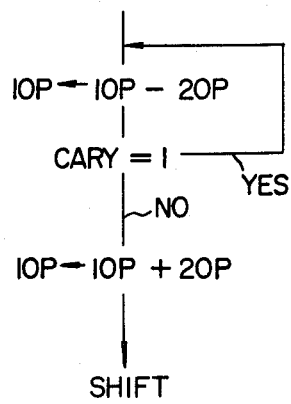
F I G. 2
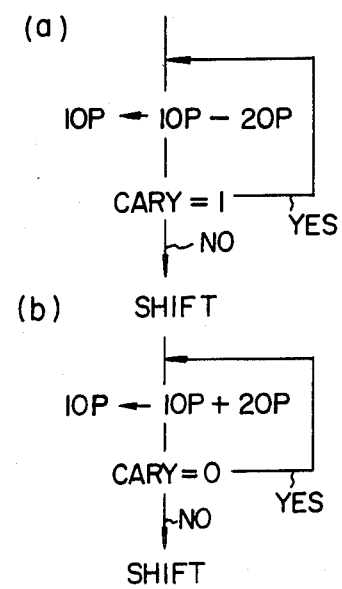
F I G. 3
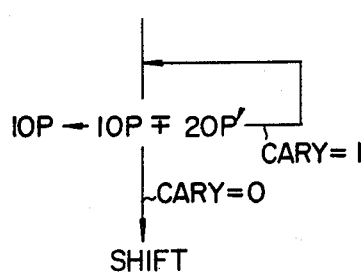
F I G. 5
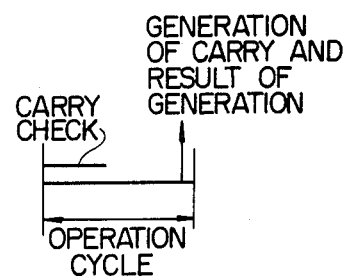

DIVISION APPARATUS

The present invention relates to a division apparatus which is envisaged to be employed in a data processing system.

Two basic types of division operations are known. They are a restore type division operation schematically illustrated in FIG. 1 and a non-restore type division operation illustrated in FIG. 2, respectively. In these figures, a symbol 10P represents a dividend or an intermediate remainder (hereinafter generally referred to as the intermediate remainder so long as no necessity arises for discriminating the dividened and the intermediate remainder from each other), 20P represents an integral multiple of a divisor and CARY represents a carry produced during a preceding arithmetic operation. As will be seen in FIGS. 1 and 2, determination of a quotient of one digit or place and an intermediate remainder requires iterative execution of two processing steps in either of the restore type or non-restore type division operations, i.e. arithmetic operation step of addition or subtraction of the intermediate remainder and the integral multiple of the divisor and the step of determining the presence or absence of a carry involved in the result of the arithmetic operation step. Further, the restore type division requires additionally a processing step for correcting the intermediate remainder. On the other hand, in the case of the non-restore type division, the processings illustrated at (a) and (b) in FIG. 2 have to be repeated every time the quotient of one digit or place is determined. In this way, the hitherto known division processes require a large number of the processing steps and encounter difficulty in increasing the operation speed.

An object of the present invention is to provide a division apparatus which is capable of performing division with a reduced number of the processing steps and hence at an increased operation speed.

In view of the above and other objects which will become apparent as this description proceeds, it is a feature of the present invention that the quotient of one digit or place and the intermediate remainder are obtained by repeating a single type of processing for adding the intermediate remainder and the integral multiple of the divisor, as is illustrated in FIG. 3. More specifically, referring to FIG. 3, 20P' represents on one hand the integral multiple of the divisor when the carry produced during the preceding operation is 0 (zero) and represents on the other hand the complement of the integral multiple of the divisor when the carry produced during the preceding operation is 1 (one). Further, the initial carry for a given operation is set at 0 (zero) when the carry produced during the preceding operation is 0 (zero) while being set at 1 (one) when the carry of the preceding operation is 1 (one).

The above and other objects, features and advantages of the present invention will be more readily understood by reading the following description of preferred embodiments of the invention. The description makes reference to the accompanying drawings, in which:

FIG. 1 is a view for schematically illustrating the principle of a hitherto known restore type decimal division scheme for determining a quotient of one digit and an intermediate remainder;

FIG. 2 illustrates at (a) and (b) the principle of a hitherto known non-restore type decimal division scheme for determining a quotient of one digit and a remainder;

FIG. 3 is a view for illustrating the principle of a decimal division scheme for determining a quotient of one digit and an intermediate remainder according to the teaching of the present invention;

FIG. 5 is a view for schematically illustrating an arithmetic operation cycle executed by the apparatus shown in FIG. 4.

Figure 4:
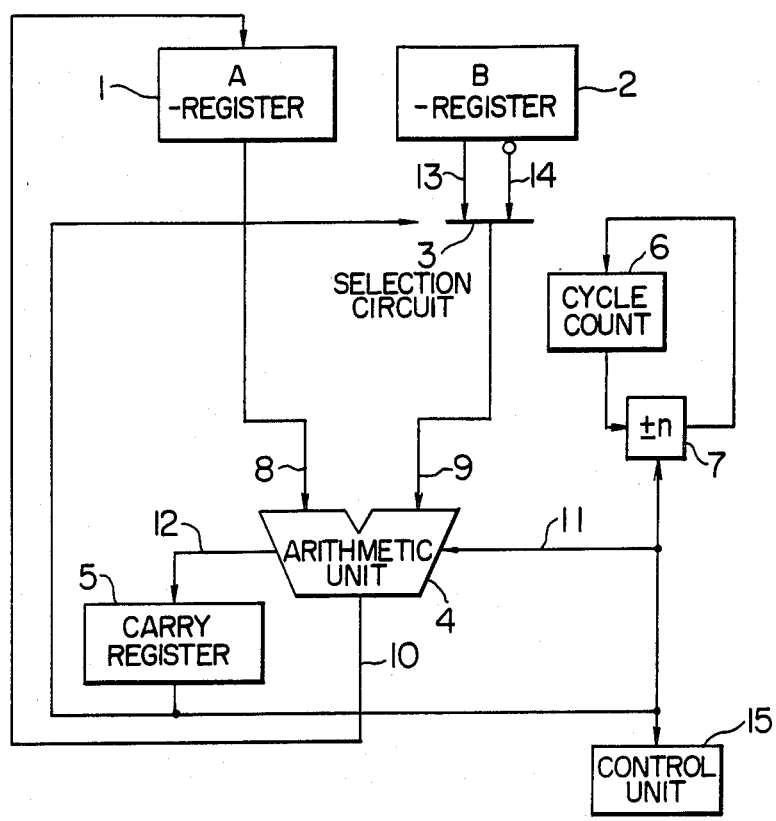
FIG. 4 shows in a functional block diagram an arrangement of a decimal division apparatus according to an embodiment of the present invention.

Now, the invention will be described in detail in conjunction with exemplary embodiments thereof illustrated in the drawings.

In the case of the embodiment illustrated in FIGS. 3, 4 and 5, it is assumed that only an onefold multiple of a divisor is used as the integral multiple of the divisor.

Referring to FIG. 4 which shows in a functional block diagram an arrangement of a decimal division apparatus according to an embodiment of the present invention, a dividend or an intermediate remainder A is stored in a register 1, an integral multiple B (i.e. onefold multiple in this case) of the divisor is stored in a register 2, and a carry produced during a preceding arithmetic operation is stored in a register 5. A reference numeral 6 denotes a register for counting the number of cycles of arithmetic operations. A numeral 3 denotes a selection circuit for outputting the content of the register 2 supplied thereto over a line 13 when the content of the register 5 is 0 (zero) and for outputting a complement of the content of the register 2 supplied thereto over a line 14 when the content of the register 5 is 1 (one). A numeral 4 denotes an arithmetic circuit for peforming a decimal operation on the data supplied from the register 1 and the selection circuit 3 through lines 8 and 9, respectively. The arithmetic circuit or unit 4 fetches the content of the register 5 over a line 11 as an initial carry and outputs the result of the performed arithmetic operation on a line 10 and a carry on a line 12 when overflow occurs. The data on the lines 10 and 12 are placed in the registers 1 and 5, respectively. A reference numeral 7 denotes a constant adding/subtracting circuit for performing addition and/or subtraction of a value corresponding to the integral multiple. When the content of the register 5 is 0, the constant adding/subtracting unit 7 performs subtraction while performing addition when the content of the register 5 is 1. Since only the onefold multiple equal to 1 (one) is used as the integral multiple of the divisor, it can be said that the constant adding/subtracting unit 7 is equivalent to an addition/subtraction unit of 1 (one). A reference numeral 15 denotes a control unit for controlling the whole system with the aid of a microprogram or the like.

In the apparatus illustrated in FIG. 4, arrangement is so made that the operation proceeds in predetermined cycles with one processing step being executed at each of the cycles. In one operation cycle, the result of arithmetic operation and a new carry are produced at the end of that one cycle, and the control unit 15 determines the presence or absence of the carry generated in the preceding operation cycle by checking the content of the register 5 in parallel with the execution of the arithmetic operation, as will be seen from FIG. 5. On the basis of the result of the carry check, the control unit 15 determines whether the operation cycle shown in FIG. 3 is to be repeated or whether a shift is to be executed in the succeeding cycle. More specifically, when the carry is found to be 1 (one), the control unit 15 instructs that the arithmetic operation cycle be repeated in the succeeding cycle. On the other hand, when the carry is 0 (zero), the control unit 15 instructs that the shift of the intermediate remainder be executed in the succeeding cycle.

Now, the operation of the apparatus shown in FIG. 4 will be described below.

At first, for initialization, a dividend A is loaded in the register A and a onefold multiple of the divisor B is set in the register 2 while 1 (one) is placed in the register with 0 (zero) being placed in the register 6. Subsequently, a first arithmetic operation cycle is activated. Since the content of the register 5 is now 1 (one), the output of the selection circuit 3 represents the complement of the divisor B. Further, since the initial carry is equal to 1 (one), the arithmetic circuit 4 executes in the current operation cycle the arithmetic operation: $A+B+1=A-B$, i.e. subtraction of B from A. In this connection, when the carry of 1 (one) is outputted on the line 12, this means that relation of magnitude given by $A \geq B$ has existed between the dividend A and the divisor B. This carry is placed in the register 5 and indicates that subtraction is to be effected in the succeeding operation cycle. On the other hand, the constant adding/subtracting circuit 7 operates to increment the content of the register 6 by 1 (one) because of the content of the register 5 being 1 (one) in the course of the first operation cycle described above. Further, the control unit 15 instructs that the arithmetic operation be repeated, since the content of the register 5 is 1 (one).

In this manner, the second operation cycle is activated, whereby the subtracting operation is executed in a manner similar to that of the preceding cycle. In the course of this second operation cycle, the constant adding/substracting circuit 7 increments the content of the register 6 by 1 (one) since the content of the register 5 is 1 (one). Further, the control unit 15 also instructs that the operation cycle be repeatedly executed.

In this manner, the same operation is successively repeated so long as the carry outputted on the line 12 continues to be 1 (one). When the carry outputted on the line 12 becomes 0 (zero) in the course of the repeated executions of the same operation cycle, the content set in the register 1 represents a value which is smaller than the aimed intermediate remainder by the onefold multiple of the divisor.

In this case, the content of the register 5 becomes zero in the succeeding arithmetic operation cycle. Accordingly, the selection circuit 3 outputs the content of the register 2 as it is. Further, the initial carry is zero. Thus, the arithmetic unit 4 performs the arithmetic operation of $A+B+0=A+B$, i.e. the addition of A and B. This addition necessarily results in either a positive value of 0 (zero) which is equal to the aimed intermediate remainder. At that time, carry is outputted without fail.

In the meantime, the constant adding/subtracting circuit 7 decrements the content of the register 6 by 1 (one), taking into account the fact that the content of the register 5 is zero. On the other hand, the control unit 15 no longer issues the command for repetition of the operation cycle, since the content of the register 5 is zero.

After the execution of the final operation cycle has been completed, the control unit 15 executes the required processings such as the shift of the intermediate remainder set at the register 1. After the execution of this processing, the operations similar to those described above are repeated to determine a new digit of the quotient.

With the decimal division apparatus described above, the quotient of one digit as well as the remainder of a given decimal division can be determined in the $(i+2)$ cycles, where i represents the quotient of a given member of 0, 1, 2, ... or 9. Accordingly, 6.5 cycles $$= 1/10 \sum_{i=0}^{9} (i + 2)$$

on an average is sufficient for the arithmetic processing step to be executed. In contrast, in the case of the restore type addition scheme described hereinbefore in conjunction with FIG. 1, it takes $(2i+3)$ cycles to determine the quotient of one digit. Accordingly, the arithmetic processing step requires for the execution thereof 12 cycles $$\left\{ = 1/10 \sum_{i=0}^{9} (2i + 3) \right\}$$

on an average. On the other hand, in the case of the non-restore type addition scheme illustrated in FIG. 2 at (a) and (b), the processing step requires 11 cycles $$\left\{ = 1/10 \sum_{i=0}^{9} (2i + 2) \right\}$$

on an average because determination of the quotient of one digit requires $(2i+2)$ cycles.

It will thus be appreciated that the decimal division apparatus shown in FIG. 4 can enjoy an increased operation speed which is about twice as high as that of the hitherto known apparatus.

As will be apparent from the foregoing description of an exemplary embodiment of the present invention, the quotient of one digit and the remainder can be obtained solely by repeating the single procedure of adding the intermediate remainder with the integral multiple of the divisor, as illustrated in FIG. 3, whereby the speed of the dividing operation can be greatly increased as compared with the hitherto known division apparatus.

Figure 6:
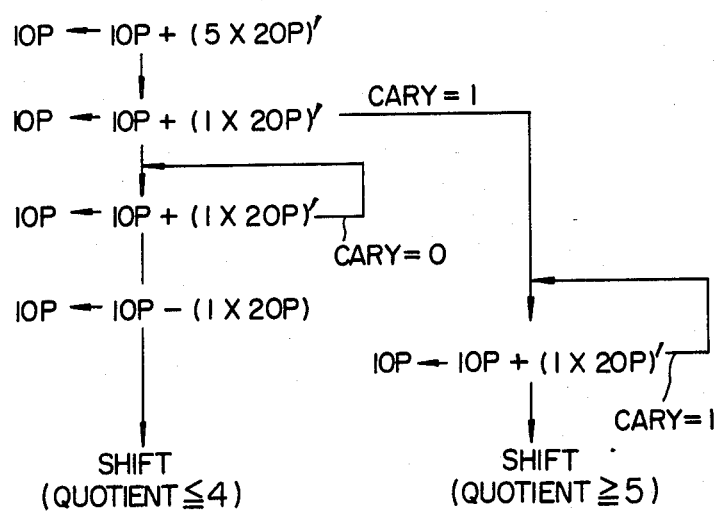
FIG. 6 is a view to schematically illustrate a decimal division for determining a quotient of one digit and an intermediate remainder on the basis of quintuple and onefold multiples of a divisor, respectively.

In the case of the example described above, only the onefold multiple of a divisor is used as the divisor B. It should however be understood that high speed operation also may be realized for determining a quotient not smaller than 5 by preparing a quintuple multiple of the divisor in addition to the onefold multiple thereof, as is illustrated in FIG. 6.

By way of example, when the quotient of 6 (six) is to be obtained, subtraction of a quintuple multiple of the divisor is effected in the first arithmetic operation cycle, to produce a carry. Accordingly, a subtracting operation is effected in the succeeding or second arithmetic cycle by using the onefold multiple. During the second arithmetic cycle, the carry produced during the preceding cycle is determined, whereupon branching is made to an arithmetic operation loop to determine the quotient greater than 5, inclusive. Since the carry is also produced in the second arithemtic operation, subtraction of the onefold multiple of the divisor is also effected in the third arithmetic cycle (i.e. the first step of the arithmetic operation loop for determining the quotient of 5, inclusive). Further, since the carry produced during the second operation cycle is 1 (one), execution of the arithmetic operation loop is repeated in the fourth operation cycle. However, when the carry resulted from the third operation cycle (i.e. subtraction of the multiple of 1) is 0 (zero), addition of the onefold multiple is carried out in the fourth cycle, which is followed by the shift operation. At that time, the register for storing the quotient contains $6=5+1+1-1$.

Although the foregoing description of the embodiments has been made on the assumption that the invention is applied to decimal division, it is self-explanatory that the present invention can be equally applied to a binary division.

What is claimed is:

1. An apparatus for division, comprising: a first register for storing a dividend or an intermediate remainder; a second register for storing an integral multiple of a divisor; a third register for storing a carry obtained as part of the result of an arithmetic operation; complement means connected to said second register for producing the complement of the integral multiple of the divisor; a selection circuit connected to said second register and to said complement means for selecting the complement of the integral multiple of the divisor when the carry produced during the preceding arithmetic operation is 1 (one) and for selecting the integral multiple of the divisor when said carry produced during the preceding operation is 0 (zero) according to the contents of said third register; an arithmetic unit for performing addition on the basis of the output of said selection circuit applied to one input and the content of said first register applied to another input with the carry resulted from the preceding operation being utilized as an initial carry; counter means for counting a number which corresponds to said integral multiple of said divisor; means for controlling operation of said counter means and said arithmetic unit in dependence on the value by the carry produced during the preceding arithmetic operation is stored in said third register; and means for placing the result of the arithmetic operation in said first register whereby the quotient is determined on the basis of the content of said counter means.

2. A division apparatus according to claim 1, wherein the initial value of said third register is set to 1 (one) to allow the operation for division to be initiated.

3. An apparatus for performing division by repeating an arithmetic operation cycle, comprising:
data holding means for holding a dividend or an intermediate remainder;
data selection means for outputting an integral multiple of a divisor or the complement thereof, selectively;
an arithmetic unit connected to said data holding means and said data selection means for performing addition of the data received from said data holding means and the data received from said data selection means;
data transfer means for transferring the result of an arithmetic operation from said arithmetic unit to said data holding means;
means for applying a carry produced by said arithmetic unit to said data selection means to control the selecting operation of said data selection means;
first control means for causing arithmetic operation cycles to be carried out successively by said arithmetic unit in each of which said complement is outputted from said data selection means and said arithmetic unit is controlled to perform an addition operation; and
second control means responsive to said data selection means outputting said integral multiple of the divisor for controlling said arithmetic unit to perform an addition operation cycle which is next to the arithmetic operation cycle based on said first control means in which no carry is produced from said arithmetic unit;
wherein one figure of the quotient is obtained after carrying out one arithmetic operation cycle which is based on said second control means.

* * * * *